United States Patent

Moore

[15] 3,703,716
[45] Nov. 21, 1972

[54] AUTOMATIC TRANSMISSION FLUID REPLENISHMENT MEANS AND LEVEL INDICATOR

[72] Inventor: Thomas Moore, 7235 Leavitt Road, Elyria, Ohio 44035

[22] Filed: July 19, 1971

[21] Appl. No.: 163,799

[52] U.S. Cl. ............... 340/244 B, 137/412, 137/434
[51] Int. Cl. ......................... F16k 31/18, G08b 21/00
[58] Field of Search ........ 137/412; 340/244 B, 244 A

[56] References Cited

UNITED STATES PATENTS

| | | | |
|---|---|---|---|
| 1,603,281 | 10/1926 | Heeter | 340/244 A |
| 1,768,446 | 6/1930 | Gron | 340/244 A |

*Primary Examiner*—Thomas B. Habecker
*Attorney*—Penrose Lucas Albright et al.

[57] ABSTRACT

An automatic transmission replenishment container and fluid level indicator having a tube inserted into the transmission fluid with an opening located below the normal fluid level, within, however, the operating level of the transmission, the tube connecting on its upper end into the bottom of a clear plastic container of about one quart capacity which further connects at its top with a partial vacuum source such as a vehicle's intake manifold. A float in the container is buoyed by transmission fluid drawn into the container by the vacuum, the float incorporating means to secure the vacuum line into the container when sufficient fluid has been drawn into the container. The float also includes an electrical conductor which, when the float is not buoyed by the fluid, closes an electrical circuit which extends into the container to energize an indicator. In the event the transmission fluid descends to the tube opening, fluid in the container received in the transmission maintains the transmission fluid at an operating level until at least the container fluid has been entirely emptied from the container.

9 Claims, 3 Drawing Figures

INVENTOR
THOMAS MOORE

3,703,716

AUTOMATIC TRANSMISSION FLUID REPLENISHMENT MEANS AND LEVEL INDICATOR

BACKGROUND OF THE INVENTION

A substantial source of difficulty with the automatic transmissions of automobiles is caused by a slow leakage of the transmission fluid usually around or through the seals. However, in most cases, the level of automatic transmission fluid is not checked with the same frequency as the lubricating oil level in an internal combustion engine because it generally is in a less accessible location and because the motor must be running when the check is made. Although a minor difficulty causing the fluid leakage may have been developing for sometime, if the level of the transmission fluid is not monitored with reasonable frequency, severe damage to the transmission may result. Accordingly, a need exists and has existed for some time for an improved reliable fluid level indicator for automatic transmissions.

SUMMARY OF THE INVENTION

The invention relates to a fluid level indicator for automatic transmissions and, more particularly, to such an indicator which is easily adaptable to existing conventional automatic transmissions and which, in addition, provides limited replenishment of fluid to the transmission if needed, simplifies the adding of fluid to the transmission, and indicates when the fluid needs to be changed.

It has occurred to the inventor that the tube presently utilized to receive the dip stick in automatic transmissions of the type found in most automobiles today, can be used advantageously to receive an apparatus which, among other things, signals the driver of a vehicle when the transmission fluid is near to being dangerously low or has declined an amount which the operator of the vehicle should be informed of. The liquid level indicator in accordance with my invention utilizes the principle that a solid column of liquid can be drawn into a segregated container at a higher level by differential pressure as long as the intake to the liquid is below the liquid level. However, if the liquid level falls below such intake, gaseous fluid displaces the liquid fluid through the intake into the container. Thus, by providing a segregated container which is connected on its upper end to a partial vacuum source and at its lower end through a conduit to an intake positioned below the normal fluid level of an automatic transmission, the presence or absence of liquid in the container can be utilized to signal whether the level of liquid is above or below the intake opening. Moreover, fluid in the container automatically maintains the liquid level at about the level of the intake opening until emptied. By making the container of a clear plastic, the color of the fluid is observable in the container when the motor is running. If the fluid is reddish-brown, it should be changed. Further, the container is in a more accessible location than the tube for the dip-stick and therefore provides a convenient place for adding transmission fluid without a special funnel.

A fluid level indicator in accordance with my invention is relatively easy and inexpensive to manufacture. It is reliable in operation and can be adapted to many types of automobile transmissions as well as being easily installed on existing automobiles.

Other objects, adaptabilities and capabilities will be appreciated by those skilled in the art as the description progresses, reference being had to the accompanying drawings, in which:

DESCRIPTION OF THE PREFERRED EMBODIMENT

Figure 1:
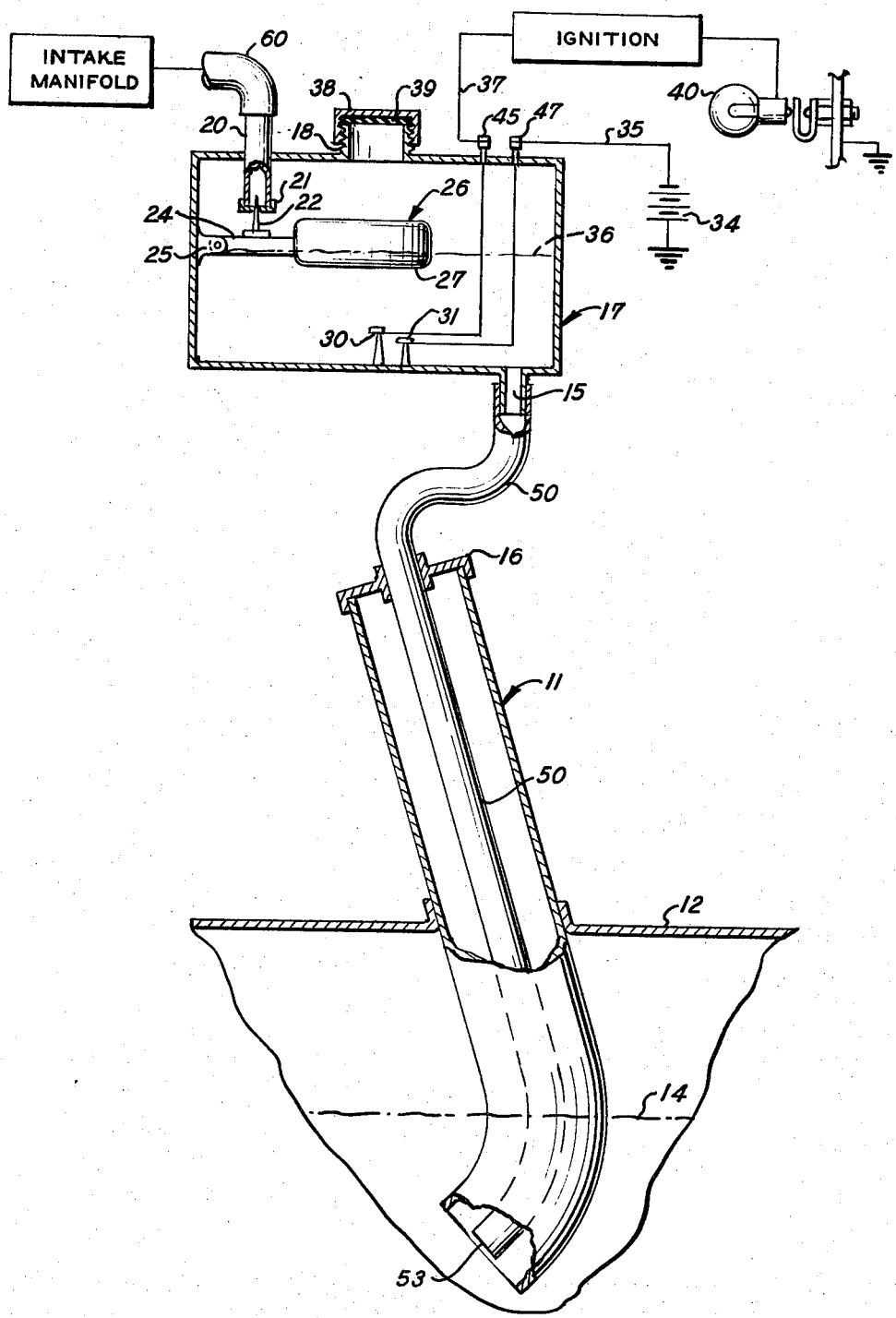
FIG. 1 shows the invention in partial cross-section with the electrical circuit being shown, in part, schematically.

Referring to the FIGS., the level indicator in each embodiment includes an intake conduit 50 received in a tube 11 (which can be the dip-stick tube) extending generally upwardly from the casing 12. Conduit 50 has an intake opening 53 which normally extends below the level of the transmission fluid in casing 12 which contains the automatic transmission and fluid 14. Conduit 50 is inserted in tube 11 to a position wherein opening 53 is located at a point below the desired level of fluid 14 so that, if the fluid level in the transmission should fall below intake opening 53, the operator of the vehicle should be informed of the condition.

It will be noted from the drawings that the conduit 50 is received snugly by a tube cover 16 which in turn fits on the top of the tube 11.

Conduit 50 extends upwardly from cover 16 where it is received by a nipple 15 which leads into the bottom of container 17. Container 17 has a sufficient volume to hold a quart or more of liquid and preferably is composed of a transparent plastic material. Container 17 includes in its upper aspect a further nipple 20 to which a flexible conduit 60 connects. The other end of conduit 60 is secured to the intake side of the manifold or of the automobile's carburetor. It will be noted that nipple 20 extends into the container 17 and has secured to its lower end a needle valve seat 21. A needle valve 22 engages the valve seat 21 and is secured to the top of the lever 24 which is hinged to a bracket 25 which is affixed to or protrudes from container 17. On the other end of lever 24, a doughnut shaped float 26 is secured. Float 26 is preferably composed of a metallic material that is hollow. In any event, it contains an electrically conductive portion which functions as an electrical conductive bridge 27 when float 26 rotates clockwise relative to bracket 25 as seen in FIG. 1 whereby conductive bridge 27 makes an electrical contact with the contact members 30 and 31 to close an electrical circuit from battery 34, electrical conductor 35, an electrical conductor 37 to lamp 40. Conductors 35 and 37 include terminals 45 and 47, respectively, which connect into container 17. When float 26 rotates counter-clockwise as seen in FIG. 1, needle 22 is brought upwardly into valve seat 21 and effectively secures the interior of container 17 from the intake manifold via nipple 20 and conduit 60. Thus it will be understood that when float 26 is raised due to the buoyancy effect of transmission fluid 36 therein, the valve assembly which is composed of needle 22 and valve seat 21 is closed. Such valve, however, is opened when float 26 is in a lowered position.

In operation, when the motor of the vehicle having the automatic transmission enclosed by casing 12 is started, a sub-atmospheric pressure is applied by the manifold intake to the flexible conduit 60 and into the container 17 via nipple 20 and valve seat 21. In the presence of such subatmospheric pressure, normal atmospheric pressure on fluid 14 forces the fluid into the conduit 50 and the container 17 via nipple 15 until the level of fluid 36 raises sufficiently so that needle valve 22 is seated in the valve seat 21. With fluid 36 at such level, float 26 retains needle 22 firmly seated in valve seat 21 whereby with no concentration between the subatmospheric pressure created by the intake manifold via conduit 60 and nipple 20, no further fluid is drawn into the container 17 from fluid 14 in casing 12.

If the level of the fluid 14 descends below intake 53, air enters into intake 53 to displace fluid in container 17 via conduit 50. Accordingly, the float 26 lowers causing the conductive bridge 27 to connect contact members 30 and 31 thereby closing the circuit between battery 34 and lamp 40 to energize the light and signal the low level condition of the automatic transmission fluid.

When the vehicle's motor is not operating, fluid in container 17 attempts to seek its own level and thus returns to fluid 14 in casing 12. When this occurs, float 26 moves downwardly so that the conductive bridge 27 again contacts contact members 30 and 31 to energize lamp 40 as indicated above. However, since normally conductor 37 is connected through the automobile's ignition switch, assuming the ignition switch is off, lamp 40 is not energized. Subsequently, in such condition, when the ignition switch is turned on, the lamp 40 is energized until sufficient fluid is drawn from the fluid 14 into the container 17 so that float 26 raises the conductive bridge 27 out of contact with contact members 30 and 31 thereby opening the electrical circuit to lamp 40 to de-energize same. In practice, this takes a short time, say from less than five seconds to perhaps as long as 30 seconds. It performs the function of informing the operator of the vehicle that lamp 40 is operational.

In the event that some leakage should occur around needle 22, transmission fluid leakage is minimal due to the increased resistance of the fluid through the needle valve seat 21 which has a relatively narrow diameter.

An opening surrounded by threaded flange 18 is provided on the top of container 17. Flange 18 receives a threaded cap 38 having a rubber washer 39 to insure a hermatic seal between cap 38 and flange 18. When transmission fluid needs to be added to casing 12, this can be conveniently accomplished by removing cap 38 and adding the needed fluid through the opening surrounded by flange 18.

Figures 2, 3:
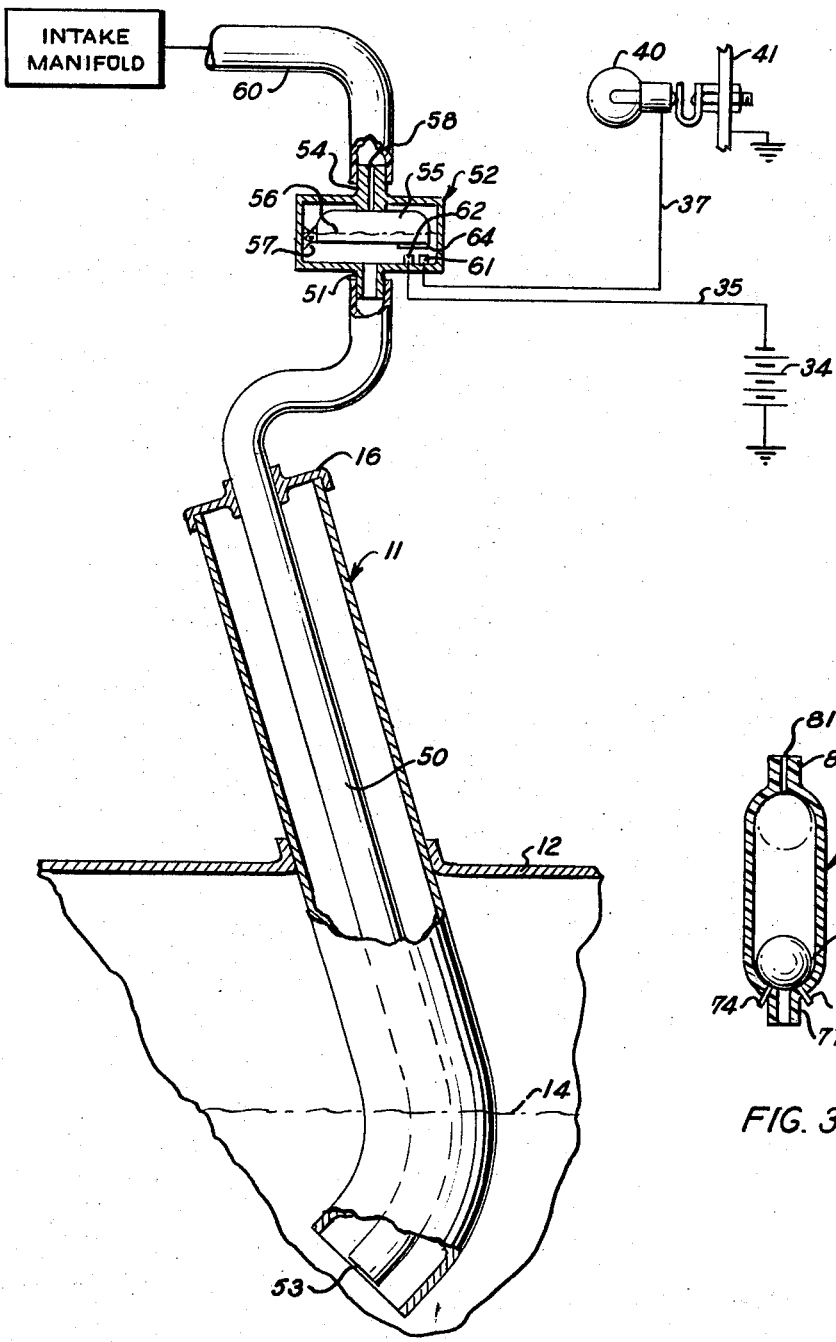
FIG. 2 shows a further embodiment of the invention in the same manner as FIG. 1.
FIG. 3 illustrates a modified embodiment of the container which is shown in FIGS. 1 and 2.

FIG. 2 shows a modified version wherein a smaller container than 52 is utilized instead of container 17. The same reference numerals have been used in FIG. 2 as in FIG. 1 for components which are substantially the same.

In FIG. 2, conduit 50 extends upwardly from cover 16 to where it is received by a nipple 51 which leads into the bottom of container 52. Container 52 includes in its upper aspect a further nipple 54 to which flexible conduit 60 connects. The other end of conduit 60 is secured to the intake side of the manifold or of the automobile's carburetor. It will be noted that nipple 54 is provided with a relatively narrow channel 58 which, however, is large enough so that gaseous fluid can pass readily therethrough, but is of sufficiently small diameter so that viscous liquids such as transmission fluid can be drawn only relatively slowly through channel 58. Float 55 is hinged to container 52 by means of a hinge assembly 57. Float 55 also has connected to its lower proportion a conductive bridge part 64 which is adapted, when float 55 as seen in FIG. 2 turns clockwise about hinge assembly 57, to contact with contact members 61 and 62 to close the electrical circuit from battery 34, electrical conductor 35, an electrical conductor 37 to lamp 40. When the float 55 turns counterclockwise about hinge assembly 57 as seen in FIG. 2, it comes into contact with the lower face of nipple 54 and effectively closes the channel 58. Thus, in effect, float 55 and nipple 54 form a valve which is closed when float 55 is in a raised position and open when float 55 is in a lowered position.

In operation, when the motor of the vehicle having the automatic transmission is started and a subatmospheric pressure is applied by the motor's intake to flexible conduit 60, transmission fluid 14 is drawn into intake 53, through conduit 50 and nipple 51, and into container 52 to a level indicated by reference numeral 56. When at such level, float 55 closes channel 58 and as long as it remains closed, no further fluid is drawn into the container 52. Should, however, the level of the fluid 14 drop below the intake 53, air enters intake 53 which displaces liquid in container 52 via conduit 50. Accordingly, the float 55 lowers causing conductive part 64 to bridge contact member 61 and 62 thereby closing the circuit between battery 34 and lamp 40 to energize the light and signal the low level condition of the automatic transmission fluid.

It will be appreciated that when the automobile motor is not running, fluid in container 52 tends to seek its own level and returns to casing 12. This causes float 55 to bring the conductive part 64 against the contact member 61 and 62 and thus energize the lamp 40 as indicated before. Normally conductor 37, however, is connected through the automobile's ignition switch. Thus, when the ignition switch is initially turned on, the lamp 40 is energized until sufficient fluid is drawn into container 52 so that float 55 raises conductive part 64 out of contact with the contact member 61 and 62 thereby opening the electrical circuit to lamp 40 which de-energized it. Although in practice this takes a relatively short period of time, it does perform the function of informing the operator of the vehicle that the lamp 40 is operational. In the event some leakage should occur around float 55 into nipple 54, transmission fluid leakage is minimal due to the increased resistance of transmission fluid into and through nipple 54.

FIG. 3 shows a modified version of a container 72 which may be utilized instead of container 52. Container 72, which preferably is clear plastic, has an upper nipple 80 with a channel 81 which has a diameter comparable to that of channel 58 and is adapted to receive flexible conduit 60. A further nipple 77 at the bottom of container 72 is adapted to receive conduit 50. Also near the bottom of container 72 are received a pair of contact members 74 and 75 which are adapted to connect to conductors 35 and 37 respectively. A float 76 is received within container 72 which has a diameter only slightly less than of the interior diameter of container 72. Float 76 is composed of an electrically conductive metal and is hollow so that it floats in transmission fluid received therein through nipple 77. It is sufficiently heavy, however, that when in the position shown in dot-dash lines it will not be held in such position due to suction from flexible conduit 60 should the fluid which has raised it to such a position by means of its buoyancy descend in container 72. The advantage of the container 72 is that a hinge assembly such as 57 shown in FIG. 1 is not necessary and a momentary lowering of the level of fluid 14 below intake 53 will not cause the float 76 to descend sufficiently to energize lamp 40 and thus give a false indication of the level of the transmission fluid.

Although I have described the preferred embodiments of my invention, it is to be understood that it is capable of other adaptations and modifications. For example, the same basic arrangement may be utilized as an indicator for lubricating oil level. Instead of, or in combination with, lamp 40, a buzzer or bell may be utilized.

Having thus described my invention, what I claim as new and desire to secure by Letters Patent of the United States is:

1. In combination with a casing which contains an electrically non-conductive fluid, a fluid level indicator which comprises a conduit extending from outside the casing into said fluid, a container connected to said conduit outside of said casing, a further conduit connected to said container and to a partial vacuum source, a float received in said container, said float including electrical conductive bridge means, said float being buoyant relative to said fluid and movable within said container, electrically operated indicia means, electrical energy producing means, and a circuit for connecting said indicia means to said energy producing means, said circuit means being received in said container and including a pair of separated contact means therein, said contacts being situated in said container relative to said conductive bridge means whereby when said float means descends a predetermined amount said conductive bridge means conductively connects said contacts and closes said circuit to energize said indicia means.

2. The apparatus of claim 1 wherein said float means is hingedly received in said container.

3. The apparatus of claim 1 wherein said float means includes means for closing said further conduit to said partial vacuum.

4. The apparatus of claim 3 wherein a needle valve is included on said float means which is adapted to close said further conduit to said partial vacuum source.

5. The apparatus of claim 1 wherein said casing contains an automatic transmission for a prime mover and said fluid is automatic transmission fluid.

6. The apparatus of claim 1 wherein said partial vacuum source comprises the intake manifold of an internal combustion engine.

7. The apparatus of claim 1 wherein said container has a capacity of at least about one quart.

8. The apparatus of claim 1 wherein said container is composed of a transparent material.

9. The apparatus of claim 1 wherein an opening for adding fluid to said container is included in the top of said container.

* * * * *